United States Patent [19]

Naarmann

[11] Patent Number: 4,738,757

[45] Date of Patent: Apr. 19, 1988

[54] COATING CARBON FIBERS

[75] Inventor: Herbert Naarmann, Wattenheim, Fed. Rep. of Germany

[73] Assignee: BASF aktiengesellschaft, Ludwigshafen, Fed. Rep. of Germany

[21] Appl. No.: 17,239

[22] Filed: Feb. 20, 1987

[30] Foreign Application Priority Data

Feb. 20, 1986 [DE] Fed. Rep. of Germany ....... 3605378

[51] Int. Cl.$^4$ ................................................ C25D 7/00
[52] U.S. Cl. ........................................ 204/28; 204/78; 204/56.1; 427/222; 427/384; 427/385.5
[58] Field of Search ............... 204/78, 28, 294, 56 R; 427/384, 385.5, 221

[56] References Cited

U.S. PATENT DOCUMENTS

| | | | |
|---|---|---|---|
| 4,050,997 | 9/1977 | Heissler et al. | 204/28 |
| 4,547,270 | 10/1985 | Naarmann | 204/58.5 |
| 4,559,112 | 12/1985 | Tamamura | 204/28 |
| 4,661,403 | 4/1987 | Morin | 204/28 |

FOREIGN PATENT DOCUMENTS 1216549 12/1970 United Kingdom ............... 204/242

*Primary Examiner*—Richard L. Andrews
*Attorney, Agent, or Firm*—Keil & Weinkauf

[57] ABSTRACT

Electrically conductive layers are applied on to carbon fibers or filaments or sheet-like structures of these by a process in which monomers from the class consisting of the anilines or of the pyrroles or thiophenes are polymerized on the surface of the carbon structures in the presence of an electrolyte.

4 Claims, No Drawings

COATING CARBON FIBERS

The present invention relates to a process for applying electrically conductive layers on to carbon fibers or filaments or sheet-like structures by anodic oxidation of monomers from the class consisting of the aromatic primary amines in the presence of a conductive salt, with deposition of the electrically conductive layer on to the carbon fibers, filaments or sheet-like structures.

It is known that polyaniline prepared by oxidation of aniline in the presence of a conductive salt has electrical conductivity, so that it can be used as an electrical conductor in the form of films or sheets (M. Jozefowicz and R. Buvet, Chim. Macromol. 1 (1970), 469 et seq.). British Pat. No. 1,216,549 describes the use of certain forms of electrically doped polyaniline as the anode or cathode in electrochemical accumulators or batteries.

Patent Application No. P 33 27 019 (No. EP-A-84 108 455) discloses a process for the electrochemical polymerization of pyrrole, in which pyrrole is polymerized in the presence of a conductive salt in an electrolyte solvent by anodic oxidation on a sheet-like anode, sheet-like structures having a large surface area, such as woven fabrics, knitted fabrics, plaited fabrics or nets, being used, so that the polypyrrole is deposited on to the sheet-like structures and composites having good electrical conductivity are obtained.

It is an object of the present invention to provide a novel process for applying electrically conductive layers on to carbon fibers or filaments or sheet-like structures of these, which is particularly economical and leads to electrically conductive composites which can be used, for example, as electrical conductors or as electrodes in batteries.

We have found that this object is achieved by a process for applyng electrically conductive layers on to carbon fibers or filaments or sheet-like structures of these, wherein monomers from the class consisting of the heterocyclic and/or aromatic primary or secondary amines or from the class consisting or pyrroles or thiophenes are polymerized in the presence of an electrolyte, on the surface of the said fibers or filaments or sheetlike structures of these.

The advantage of the invention is that it gives electrically conductive composites having conductivities of from 0.1 to 500 S/cm. We have found that the polyanilines deposited on the carbon fibers or sheet-like structures adhere particularly firmly, so that the resulting electrically conductive structures can be subjected to particular mechanical loads without suffering a loss of conductivity.

The carbon fibers or filaments to be used for the process are obtained, for example, from polyacrylonitrile by pyrolytic methods, or by heating filaments or fabrics of polyesters at above 600° C. However, it is also possible to use the process to coat sheet-like structures of carbon fibers or filaments with an electrically conductive polymer layer. Examples of such sheet-like structures are woven fabrics, knitted fabrics, plaited fabrics, nets and nonwoven material. Sheet-like structures of this type are obtained, for example, from polyphenylene oxide by a conventional method. These sheetlike structures are likewise obtainable by pyrolysis methods if sheet-like fabrics are used directly in the pyrolysis process. The production of such fibers or filaments or sheet-like structures of these forms part of the prior art. The said fibers or filaments or sheetlike structures are coated, in a solution containing monomers and conductive salts, with the polymer which is formed from the monomer and contains the anion of the conductive salt as an incorporated unit.

The electrolyte solution contains, as monomers, a compound from the class consisting of the heterocyclic and/or aromatic primary and/or secondary amines. Aniline is particularly suitable, but it is also possible to use polyphenylenediamine or the primary amines of condensed ring systems, such as aminoanthracene, anisidine or substituted aniline or phenylenediamine. Other anodically oxidizable compounds from the class consisting of the pyrroles or thiophenes may be added to the monomers, in amounts of up to about 25%. It is also possible to carry out the anodic oxidation of the anilines in the presence of other additives, such as indigo, polyindigo or polyindophenine.

Examples of other monomers which can be polymerized are compounds from the class consisting of the five-membered heterocyclic compounds which have a conjugated $\pi$ electron system and contain nitrogen, sulfur or oxygen as heteroatoms. Examples of these compounds are those from the class consisting of the pyrroles, the thiophenes and the furans. Examples of suitable pyrroles are unsubstituted pyrrole itself as well as N-substituted pyrroles, such as N-alkylpyrroles. Other substituted pyrroles, such as 3,4-dialkylpyrroles or 3,4-dichloropyrroles, may also be used. Particularly suitable compounds from the class consisting of the thiophenes are unsubstituted thiophene itself as well as 2- and 3-alkylithiophenes, e.g. 3-methylthiophene or 2,3-diethylthiophene. Suitable compounds from the class consisting of the furans are likewise unsubstituted furan, as well as aklylfurans, such as 2-ethyl- and 2,3-dimethylfuran. The five-membered heterocyclic compounds mentioned may, however, also be polymerized together with other copolymerizable compounds, e.g. thiazole, oxazole or imidazole.

The solvent present in the electrolyte is, for example, an organic solvent, such as methanol, ethanol, a polyol, acetone or tetrahydrofuran. However, pyridine, acetonitrile, methylene chloride, glacial acetic acid, propylene carbonate and dimethyl sulfoxide are also suitable. It is also possible to use water or a mixture of water with one of the abovementioned miscible solvents.

The electrolyte furthermore contains a conductive salt. The concentration of the conductive salt in the process according to the invention is in general from 0.001 to 1, preferably from 0.01 to 0.5, mole per liter of electrolyte solvent. Conductive salt anions which have proven particularly advantageous are the tetrafluoborate, tetrafluoroarsenate, hexafluoroarsenate, hexafluoroantimonate, hexachloroantimonate, hexafluorophosphate, perchlorate, bisulfate and sulfate anions. Conductive salts which contain anions of aromatic sulfonic acids, for example the benzenesulfonate anion, the toluenesulfonate anion or anionic, polymeric aromatic sulfonic acid compounds, such as the polystyrenesulfonate anion, are also particularly advantageous. Suitable cations of the conductive salts are alkaline earth metal cations or alkali metal cations. Onium cations of nitrogen and of phosphorus are also advantageous. In addition to the ammonium ions, particular examples of these cations are tetramethylammonium, tetraethylammonium and triphenylphosphonium cations.

Particularly advantageous electrolytes are those which contain a Lewis acid. Lewis acids are described in Römpps Chemie-Lexikon, 8th edition, page 2360

(Franckh'sche Verlagshandlung Stuttgart). Examples of suitable Lewis acids are sulfuric acid, perchloric acid, tetrafluoboric acid, zinc chloride and adducts of hydrofluoric acid with ammonia.

In a particularly advantageous procedure, the electrolyte also contains an oxidizing agent in amounts of from 0.01 to 5 moles per mole of electrolyte solvent. Examples of suitable oxidizing agents are potassium chromate, potassium persulfate, iron perchlorate, hydrogen peroxide and its derivatives, and organic per compounds, such as ketone peroxides and the like. In the novel process, the concentration of the conductive salt is chosen so that in general amounts of from 10 to 40 mol %, based on 1 mole of the monomer to be polymerized, are used. The conductive salts can be used alone or as a mixture with one another.

The process according to the invention can be carried out in a conventional electrolysis cell or electrolysis apparatus. Examples of suitable apparatuses are simple electrolysis apparatuses consisting of a cell without a diaphragm and of an electrode of carbon fibers, filaments or sheet-like structures, an electrode of, for example, a noble metal and an external current source. The anode is preferably a sheet-like structure. Apart from the stated simple electrolysis cells without a diaphragm, it is also possible to use other electrolysis apparatuses for the novel process, for example cells possessing diaphragms or those possessing reference electrodes or exact potential determination. Frequently, it is advantageous to measure the quantity of electricity (A sec).

The novel process is usually carried out at room temperature. However, since it has been found that the reaction temperature in the novel process is not critical, it can of course be varied within a wide range, provided that it does not fall below the solidification temperature of the electrolyte solvent or exceed the boiling point of the said solvent. In general, a polymerization temperature of from 0° to 50° C., in particular from +10° to +30° C., has proven very advantageous.

A suitable current source for operating the electrolysis cell in which the novel process is carried out is any direct current source, for example a battery which delivers a sufficiently high electrical voltage. The novel electrochemical polymerization is usually carried out using a voltage of from 0.1 to 100, preferably from 1.5 to 25, volt. Current densities of from 0.05 to 20, preferably from 1 to 10, mA/cm$^2$ have proven advantageous.

The duration of the electrolysis depends, inter alia, on the monomer used, the electrolyte system and the particular electrolysis conditions, but is also determined decisively by the type of end product desired and can therefore vary within wide limits. In the process according to the invention, formation of the polymers begins on the sheet-like anode element, polymer formation extending over the entire anode surface in the course of electrolysis.

On the anode, a product results which contains the polymers incorporated in the sheet-like element which is used as the anode and is in the form of a woven fabric, a net or an unwoven fabric or in the form of filaments or fibers. The process can be controlled so that a closed, uniform surface of the polymers is not produced. In such a product, the mechanical, and to a large extend also the chemical, properties are substantially determined by the carbon carrier material of the electrically nonconductive sheet-like element, which now pssesses high electrical conductivity. In this version of the process, it is therefore possible to vary the electrical properties of the electrically nonconductive sheet-like element used as anode material.

If, finally, electrolysis is continued, a continuous, closed film of the electrically conductive polyaniline forms on the carbon anode, the thickness of this film being dependent on the duration of electrolysis. In this case, the resulting films of the polymer incorporated, as support and carrier material, the carbon element used as the anode.

The monomers can also be polymerized by means of oxidizing agents. Advantageously used oxidizing agents are oxygen-containing ones, which may be used in amounts of from 0.2 to 10 miles per mole of the compound to be polymerized. Larger amounts of oxidizing agents are not required since the amount is sufficient to convert the total amount of starting material to polymer. The polymerization of the monomers by means of oxygen-containing oxidizing agents is advantageously carried out in solution, water, if necessary as a mixture with organic, water-miscible solvents, having proven to be a useful solvent. However, it is also possible to use organic solvents, such as dimethyl sulfoxide, methanol, acetonitrile, ethylene carbonate, propylene carbonate, dioxane or tetrahydrofuran. Advantageously, the solutions contain from 0.1 to 50, preferably from 1 to 5, % by weight of the monomer to be polymerized. The amount of oxidizing agent to be added is determined by the above principle. The oxidation is advantageously carried out at from −20° to 40° C. Polymerization of these monomers is effected in the presence of conductive salts, which are also referred to as complexing agents or dopants. Examples of conductive salts which have proven useful are $KHSO_4$, $Na_2SO_4$, HCOOH, $LiCLO_4$, $HClO_4$, $NEt_4$, $NBu_4CLO_4$, $KAlF_3$, $NaAlf_6$, $KBF_4$, $K_2ZrF_6$, $K_2NiF_4$, $HBF_4$, $HO_2(NO_3)_2$, $H_2SO_4$, $FeCl_3$, $NOPF_6$, $KAsF_6$ and $NaPF_6$. The concentration of the conductive salt is such that not less than 1 mole of the above conductive salts are used per 3 moles of the monomer employed or of the mixture of monomers.

To apply the polymer layer on to the surface of the carbon fibers of filaments or sheet-like structures, it is advantageous if a solution of the monomer and of the conductive salt is first applied to the surface, and the material is then treated with a solution of the oxygen-containing oxidizing agent.

When the polymerization is complete, the products obtained by the novel process are washed with a solvent, preferably water or an aqueous solvent, in order to remove adhering conductive salt, and are dried at from 25° to 150° C., preferably under reduced pressure.

A procedure which is economically particularly advantageous is a continuous one in which the carbon filaments or fibers or sheet-like structures of these are fed continuously through an electrolysis bath which contains the conductive salts and solvents. In this procedure, the carbon element which has been made the anode is passed through the solution containing the monomer and conductive salt.

The carbon elements which are made the anode and on which the polyaniline is deposited have good conductivity. As stated above, the products obtained in the novel process are electrical conductors suitable for the production of electric switches, semiconductor components, electrodes for electrochemical storage elements or batteries and as shielding material.

The Examples which follow illustrate the invention. In the Examples, parts and percentages are by weight, unless stated otherwise.

EXAMPLE 1

An electrolysis cell contains a mixture of 100 cm$^3$ of acetonitrile, 2.4 cm$^3$ of 70% strength perchloric acid as the electrolyte, and 10 cm$^3$ of aniline. A film which consists of carbon fibers and contains 200 1 μm thick fibrids per cm$^2$ is made the anode. The cathode consists of a platinum sheet which is arranged 1 cm away from the anode. The current density of 2 mA/cm$^2$ is used. After 15 minutes, a polyaniline layer about 8 μm thick is found to have formed on the carbon fiber fibrids. A total of 10% by weight of the aniline is deposited as polyaniline on the carbon fiber film.

The conductivity of the film is $10^{+1}$ S/cm, whereas the uncoated carbon fiber film has a conductivity of $0.1 \times 10^{+1}$ S/cm.

EXAMPLE 2

The procedure described in Example 1 is followed, except that the electrolyte used contains acetonitrile as the solvent, as well as 10 cm$^3$ of concentrated sulfuric acid and 1 g of potassium dichromate. After 15 minutes, a 12 μm thick coating is obtained on the carbon fiber film.

The conductivity of the coated material is $0.8 \times 10^{+1}$ S/cm.

EXAMPLE 3

The procedure described in Example 1 is followed, except that 10 cm$^3$ of pyrrole are also added to the mixture. An 18 μm thick coating is obtained. The coated structure has a conductivity of 65 S/cm.

EXAMPLE 4

100 cm$^3$ of water, 10 cm$^3$ of pyrrole, 10 cm$^3$ of anitline and 3 cm$^3$ of dodecyl sulfate are homogenized at 25° C. in an ultrasonic apparatus. The mixture is introduced into an electrolysis vessel which contains an anode consisting of a nonwoven carbon fabric having an initial conductivity of 0.5 S/cm. The cathode used is nickel sheet, which is arranged 2 cm away from the anode. The anode and the cathode have dimensions of 10×10 cm. The anodic oxidation is carried out at a current density of 5 mA/cm$^2$ for 60 minutes. The resulting coated fabric has a 21 μm thick polymer coating a conductivity of 83 S/cm.

EXAMPLE 5

A solution of 15.6 g of benzenesulfonic acid, 560 g of ethanol and 71.4 g of Na$_2$S$_2$O$_8$ in 150 g of water is added to a mixture of 20 g of carbon fibers, 20 g of pyrrole and 500 g of ethanol. A coating of polypyrrole is deposited on the surface of the carbon fibers. After washing and drying, fibers having a conductivity of 25 S/cm are obtained.

I claim:

1. A process for applying electrically conductive layers on to carbon fibers or filaments or sheet-like structures of these, wherein monomers from the class consisting of the heterocyclic or aromatic primary or secondary amines or from the class consisting of pyrroles or thiophenes are polymerized in the presence of an electrolyte, on the surface of the said fibers or filaments or sheet-like structures of these.

2. A process as claimed in claim 1, wherein the electrolyte contains a Lewis acid.

3. A process as claimed in claim 1, wherein the monomers are treated with an oxidizing agent.

4. A process as claimed in claim 1, wherein the monomers are anodically oxidized.

* * * * *